United States Patent
Handa

(10) Patent No.: US 8,122,918 B2
(45) Date of Patent: Feb. 28, 2012

(54) PRESSURE DIFFERENTIAL SYSTEM FOR CONTROLLING HIGH PRESSURE REFILL GAS FLOW INTO ON BOARD VEHICLE FUEL TANKS

(75) Inventor: Kiyoshi Handa, Rancho Palos Verdes, CA (US)

(73) Assignee: Honda Motor Co. Ltd., Tokyo (JP)

( * ) Notice: Subject to any disclaimer, the term of this patent is extended or adjusted under 35 U.S.C. 154(b) by 0 days.

(21) Appl. No.: 11/468,160

(22) Filed: Aug. 29, 2006

(65) Prior Publication Data
US 2007/0051423 A1 Mar. 8, 2007

Related U.S. Application Data

(60) Provisional application No. 60/713,008, filed on Aug. 31, 2005.

(51) Int. Cl.
*B65B 31/00* (2006.01)
(52) U.S. Cl. .......................... 141/95; 141/192
(58) Field of Classification Search .................... 141/95, 141/96, 192
See application file for complete search history.

(56) References Cited

U.S. PATENT DOCUMENTS

| 3,719,196 A * | 3/1973 | McJones ...................... 137/110 |
| 3,999,936 A | 12/1976 | Hasselmann et al. |
| 5,029,622 A | 7/1991 | Mutter |
| 5,370,159 A * | 12/1994 | Price ................................. 141/4 |
| 5,406,988 A * | 4/1995 | Hopkins ........................... 141/2 |
| 5,810,058 A * | 9/1998 | Kountz et al. .................. 141/83 |
| 5,884,675 A * | 3/1999 | Krasnov ......................... 141/18 |
| 6,044,873 A | 4/2000 | Miller |
| 6,095,207 A | 8/2000 | Enders |
| 6,779,568 B2 * | 8/2004 | Borck ............................. 141/95 |
| 6,786,245 B1 * | 9/2004 | Eichelberger et al. .......... 141/95 |
| 2004/0069414 A1 | 4/2004 | Chuang et al. |

FOREIGN PATENT DOCUMENTS

| DE | 4212626 A1 | 10/1993 |
| DE | 19729267 A1 | 1/1999 |
| EP | 1205704 A1 | 5/2002 |
| JP | 9096400 A | 4/1997 |
| WO | 9736130 A1 | 10/1997 |
| WO | 9810248 | 3/1998 |

* cited by examiner

*Primary Examiner* — Gregory Huson
*Assistant Examiner* — Nicolas A Arnett
(74) *Attorney, Agent, or Firm* — Porter Wright Morris & Arthur LLP

(57) ABSTRACT

A high pressure fuel flow control device wherein pressure sensors are interposed on either side of the main restriction point of a refueling depot when the vehicle tank(s) to be refilled are interconnected in a flow circuit that connects the refilling depot and the vehicle tanks. The sensors measure pressure on the side of the depot tank[s] and pressure on the side of the vehicle tank at a restriction point in the gas flow circuit. Flow from a tank is complete and a tank is switched when the difference in the pressures sensed on opposite sides of the restriction point approaches zero or slightly greater than zero.

10 Claims, 4 Drawing Sheets

PRESSURE DIFFERENTIAL SYSTEM FOR CONTROLLING HIGH PRESSURE REFILL GAS FLOW INTO ON BOARD VEHICLE FUEL TANKS

RELATED APPLICATIONS

This application is related to and claims all benefits under 35 U.S.C. §119(e) of my earlier U.S. Provisional Patent Application Ser. No. 60/713,008 filed on Aug. 31, 2005, entitled "Pressure Differential System for Metering Gas Flow in Fuel Tanks for High Pressure Gas Fuel Powered Vehicles."

FIELD OF THE INVENTION

The present invention relates to a system for efficiently refueling high pressure, on board, vehicle gas fuel tanks with hydrogen gas and/or compressed natural gas at a refueling station where high capacity, high pressure fuel storage tanks provide the fuel to the vehicle through a consumer dispensing means.

BACKGROUND OF THE INVENTION

Current systems used to refill vehicle storage tanks with high pressure hydrogen or compressed natural gas require an expensive flow meter in a high pressure environment. Because of the expense and complexity of high pressure gas metering, the use of flow meters at retail fuel depots is not likely to be implemented. A refilling system not utilizing a flow meter is less expensive; however, currently known non-flow meter systems are operationally deficient. Pressure differences, for example, when pressure is at 3600 psi for compressed natural gas (CNG) and 5000 psi and 10,000 psi for hydrogen (corresponding to flow volume and gas quantity refilled at a refueling depot pump), are too small for meter systems to analyze and the flow monitoring system has a very low tolerance of flow disturbances.

Metering systems have been proposed, such as described in JP 2004084808 wherein Tomotaka shows a hydrogen gas supply system for a vehicle with a plurality of high-pressure hydrogen tanks. Each of the tanks is provided with a filling valve, a discharge valve, a pressure sensor and a temperature sensor. A vehicle control unit controls the filling valve and the discharge valve on the basis of parameters measured by a temperature sensor and a pressure sensor. U.S. Pat. No. 5,884,675, Krasnov, shows a cascade system for fueling compressed natural gas with two banks of cylinders. The refueling system empties the tanks in banks, one at a time, by refueling CNG vehicles using a plurality of refueling tanks. A pressure-limiting valve limits pressure in the vessel tanks to 3000 psi. When one bank is exhausted of CNG, the pump pistons stop moving, the pressure at the outlets drops to below 3000 psi, and the pressure at the inlets increases. This difference in pressure is sensed, causing the control panel to change banks. DE 19729267 (corresponding U.S. Pat. No. 6,095,207, Enders) shows a seal for a petrol refill opening in vehicle in which the internal pressure of the container above the liquid level is sensed by a sensor connected to the control unit. A differential pressure created by gas leakage from the container is sensed and refueling status is detected.

Other metering systems are described in US publication 20040069414, Chuang et al.; U.S. Pat. No. 6,044,873 to Miller; U.S. Pat. No. 5,029,622 to Mutter; U.S. Pat. No. 3,999,936 to Hasselmann et al.; JP 09096400 to Yuji et al.; EP 1205704 to Mutter; WO 9836211 to Kopl et al.; WO 9736130 (in Russian); and DE 4212626 to Seifers.

Thus, while certain pressure differential systems for measuring fuel input at refill depots are known in gas refueling operations (most simply, check valves), and the art teaches that refueling is complete when the pressure difference monitored in sensors at the station and at the vehicle tank, $dP=P1_{station}-P2_{vehicle}$, is zero or approaches slightly greater than zero, there remains a need for an inexpensive, relatively simple system for controlling the special situations involving a high pressure fuel gas volume or quantity refilled into a vehicle. Accurate control is a requirement before a high pressure gas retail depot infrastructure can be developed and implemented for widespread commercial use in consumer vehicle and commercial vehicle applications.

SUMMARY OF THE INVENTION

It is an object of the present invention to provide high pressure vehicle refueling systems using pressure sensors that are low in cost in a configuration that provides as high a pressure as possible in the vehicle tank in an as short as possible a refueling time. Typically, on board gas tank pressure in the vehicle correlates to vehicle range. Higher pressure in the tank translates to a longer vehicle range, a desirable attribute for motor vehicle users. The pressure difference system described herein is definite in measurement and stable in operation under foreseeable market conditions.

A further object of the invention is to determine when to switch the banks in a cascade fill. Conventionally, stations use a flow meter to determine when to switch banks. For example, the station central processor monitoring flow typically waits until the flow drops below a predetermined threshold value; then switches banks from a current station storage cylinder (bank) used in the refill to the next cylinder/bank. The switching is repeated until all the station banks have equalized with the vehicle's tank, or until the predetermined cut off pressure (for a full fill, or otherwise, in the vehicle) has been reached.

The pressure differential system described herein accomplishes the same result as a flow meter, but, instead of waiting until the measured flow rate reaches some threshold level, the system monitors pressure at each opposing side of a valve or other restriction point in the refill circuit, where a pressure drop would be expected should the gas not be in equilibrium. Pressure out and pressure in at the opposite sides of the restriction point are monitored. The measurement points would be P1 at the station side and P2 at the vehicle refill side, as the points are separated by the station master valve or refill nozzle or other apparatus. When the difference in the two pressures on either side of the restriction point drops below a threshold level, then the station monitoring system detects that the refill flow rate is very low, in one example, showing a full tank, and in another, indicating a need for the station control to switch gas flow to the vehicle from a next serial or parallel tank in the station bank in the event of a cascade fill. Pressure in the vehicle tank should equal pressure on the station outlet side in the course of the refill (although there will be a relatively small pressure loss through the refill dispensing line).

In brief, it is an object of the invention to use two or more pressure sensors to control the storage tank valves during a high pressure vehicle tank refill. The system described herein is principally for consumer use and provides essentially the same performance as a mass flow meter measuring method in sensing pressure to terminate a refill, to shorten refueling time and to produce as high pressure as possible in the vehicle tank, in an as short as possible a refueling time with a stable, accurate operation. A traditional method requires an expensive flow meter in a high pressure environment, making consumer use of a mass flow meter prohibitively expensive.

The invention is described more fully in the following description of the preferred embodiment considered in view of the drawings in which:

DETAILED DESCRIPTION OF THE INVENTION

The invention facilitates gas flow and tank switching at retail fuel depots for high pressure gases such as CNG (up to 3600 psi or more) and hydrogen (up to 10,000 psi or more) used to power motor vehicles. The purpose of this invention is to determine when to switch the banks in a cascade fill. Conventional stations use a flow meter to determine this. For example, using a flow meter, the station would wait until the flow drops below some threshold value and then switch from the current station storage cylinder to the next cylinder (namely, the tanks within the banks of tanks at the refill depot). This would be repeated until all the station banks have equalized with the vehicle's tank, or until the cut off pressure (for a full fill) has been reached.

The pressure difference system described herein accomplishes the same result as the flow meter, but instead of monitoring the measured flow rate until the rate reaches some threshold level, the pressure difference system of the invention will compare two pressures across a valve or some other restriction point in the gas flow circuit from the station to the depot where one would expect to see a pressure drop. These two measurement points are shown as P1 and P2 in FIG. 1. When the difference between P1 and P2 drops below a threshold level, usually zero, then the station controller will sense that the flow rate is very low, and the controller will switch gas flow from the station to the bank to the next tank or bank of tanks at the station. P3, vehicle tank pressure, in the figures is not directly used in the invention, however, P2 and P3 should be relatively the same although there will be a small pressure loss through the dispensing line.

Figure 1:
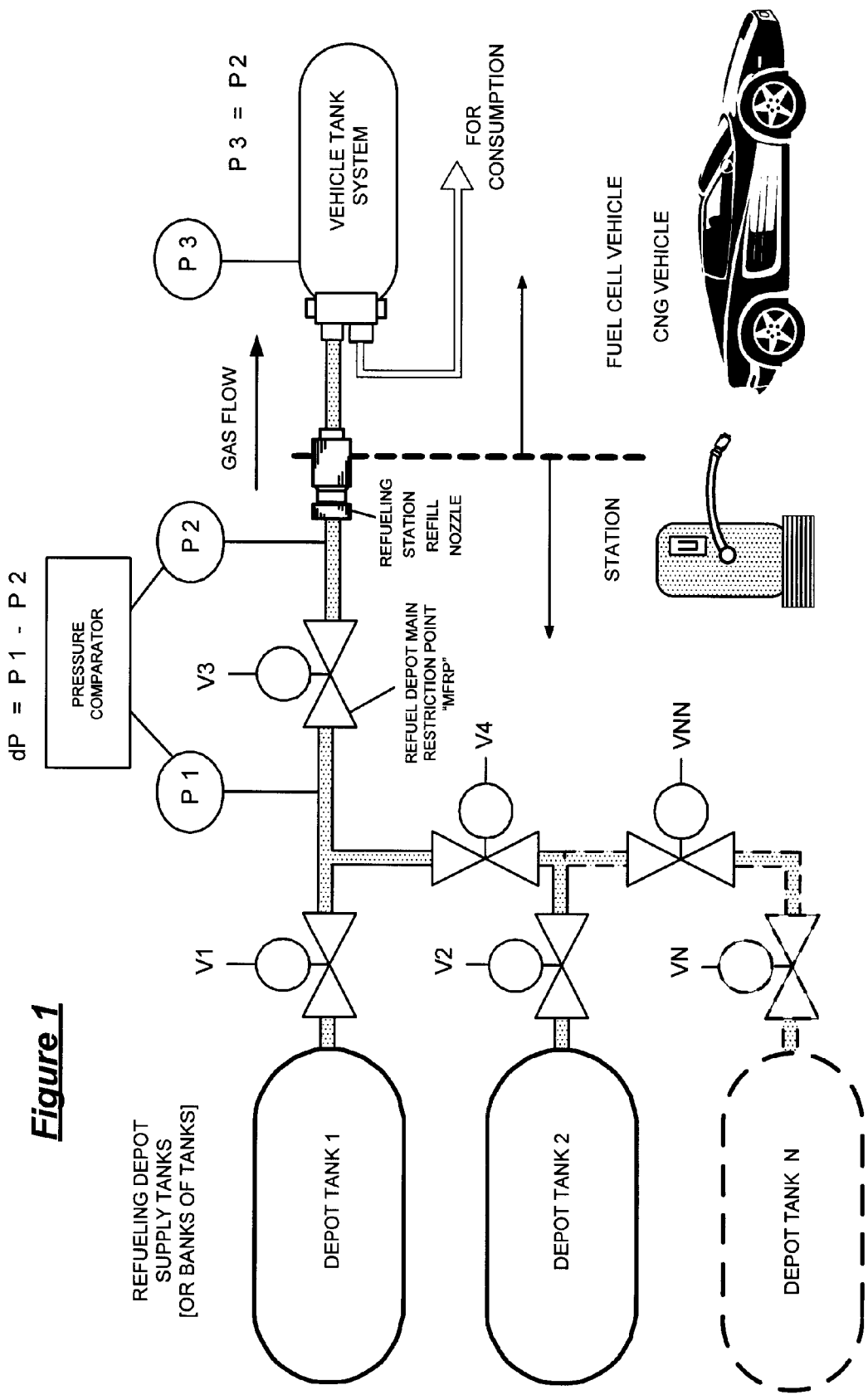
FIG. 1 illustrates the pressure differential system of the invention.

In the system shown in FIG. 1, a pressure difference flow sensing system and method, using low cost pressure sensors that eliminate the need for an expensive flow meter in the refill circuit is depicted. The use of pressure sensors in the system is less costly than current metering devices and provides a new method of fuel refill having a high tolerance of flow disturbances and great accuracy. In an overall system, tank switching allows use of the pressure monitoring system in cascade flow sequences with multiple tanks at the refueling depot.

In the example of FIG. 1, pressure sensors P1 and P2 are interposed in the gas flow circuit before and after (or on either side of) V3, the main flow restriction point ("MFRP") in the circuit, which may also be the refuel depot shut off valve before the nozzle leading to the vehicle tank. The respective sensors at the refilling station measure pressure existing in 1) the station tanks, P1, before V3 and 2) the refill pressure after the main restriction point V3 connecting the station tanks to the vehicle. (P3 is vehicle tank pressure which will typically correspond to P2 when flow is equalized and dP=0.) The two sensors, each respectively monitor pressure P1 and pressure P2 as flow into the vehicle tank progresses. Gas flow from a first tank at the station, tank 1, is complete when the difference in pressure between P1 and the pressure P2 approaches zero or slightly greater than zero, namely, when dP= $P1_{station\ TANK\ 1} - P2_{station\ MFRP} \geq$ approximately 0.

Advantages of the system are that pressure sensors are low in cost; and the differential pressure measurement method allows as high pressure as possible in the vehicle tank, a short refueling time, and a certain and stable operation. With correct tank switching, sufficient pressure in a high pressure fuel cell vehicle tank system is achieved in an acceptable time frame with a very high tolerance of disturbances. The dP system measures pressure differences in the course of vehicle tank fill and to control tank switching without the need for an expensive flow meter; pressure sensors are less expensive compared to other means. The system provides high toughness against disturbances because the subtraction process involved can cancel common measuring mode effects such as caused by noise, temperature, and compressor effects.

In one view, the dP system works similarly to an orifice flow meter that measures the pressure difference between an upper pressure and a lower pressure as a fluid passes through an orifice to sense the actual flow rate. In the invention, however, dP, in contrast to flow rate, is measured. In dispensing situations, a mass flow meter is typically preferred for accuracy compared to an orifice flow meter; the compressibility of gas causes an error in an orifice flow meter and a mass flow meter is not affected by gas compressibility. The added expense of the more accurate mass flow meter may be acceptable for a business use station. In a consumer station, however, the lower metering expense of the invention may be acceptable in offsetting incremental degrees of added accuracy.

Example 1

Example 1 in FIG. 1 illustrates an example of the dP method of the invention utilizing a bank of two tanks (A "bank" may have one or more tanks.) at a refilling station:

After connection of the refueling hose to the vehicle, refueling starts; valve V3 is opened; valve V1 is opened, then gas from tank 1 at the station flows to the vehicle tank. When dP=P1−P2<(is less than) a predetermined value, a control unit at the station ("ECU") will sense that filling from tank 1 is finished and valve V1 is closed. If dP=0 (or approximately 0), and P1 and P2 equal a desired pressure for a full fill P3 (or otherwise), then the refill is complete. Valve V1 and valve V3 are closed. If further gas is required, valve V2 and valve V4 are opened; gas from tank 2 at the station flows to the vehicle tank. When dP=P1−P2<(is less than) a predetermined value, a control unit at the station ("ECU") will sense that filling from tank 2 is finished and valve V2 and valve V4 are closed. If dP=0 (or approximately 0), and P1 and P2 equal a desired pressure for a full fill P3 (or otherwise), then the refill is complete. Valve V2, valve V4 and valve V3 are closed. The sequence above is repeated for other tanks N with valves VN and valves VNN in the bank in the event of a complex cascade fill algorithm. Valve V3 is closed when refueling is finished.

Example 2

Figure 2:
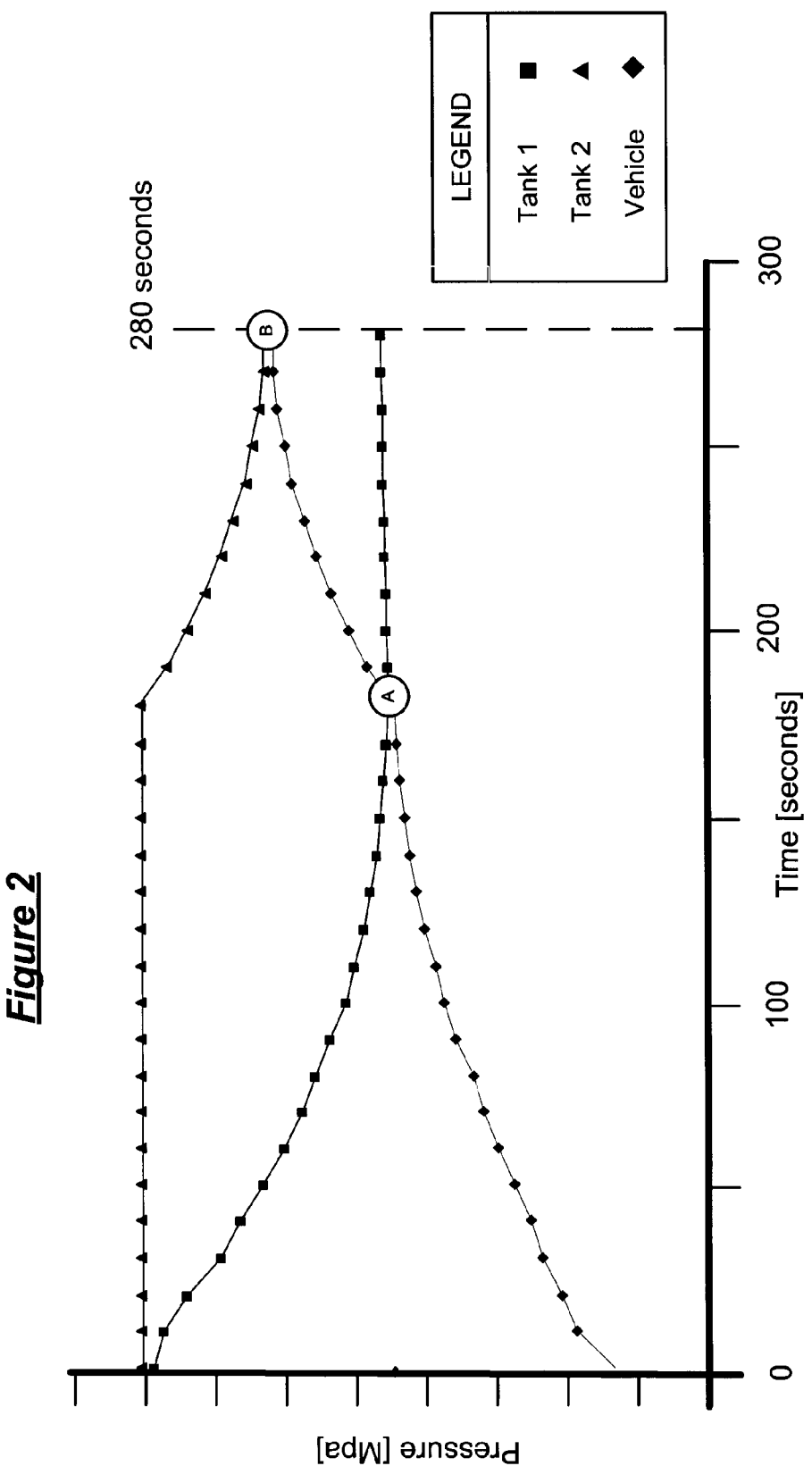
FIG. 2 is a flow chart of pressure versus time showing tank switching in a cascade fill in accordance with the system of the invention.

FIG. 2 is a chart illustrating a test of Example 1. Correct tank switching is provided and sufficient fuel pressure is achieved in the vehicle tank[s] in a reasonable time with little disturbance in refill fluid flow. Pressure in the refill depot bank of tanks, Tank 1 and Tank 2, and the vehicle tank (y-axis) is plotted against time on the x-axis. As tank 1 gas is consumed by the refill, pressure in tank 1 decreases as vehicle tank pressure increases in an almost inverse proportion. When pressure in tank 1 reaches a predetermined limit, at point "A," the ECU switches to tank 2 whereby pressure in tank 2 equalizes with the vehicle tank pressure at point "B," whereupon the refill is complete, namely $P_{vehicle}=P_{tank\ 2}$ or dP=0 at the MFRP. The ECU detects the pressure equalization and terminates the refill process.

Example 3

Figure 3:
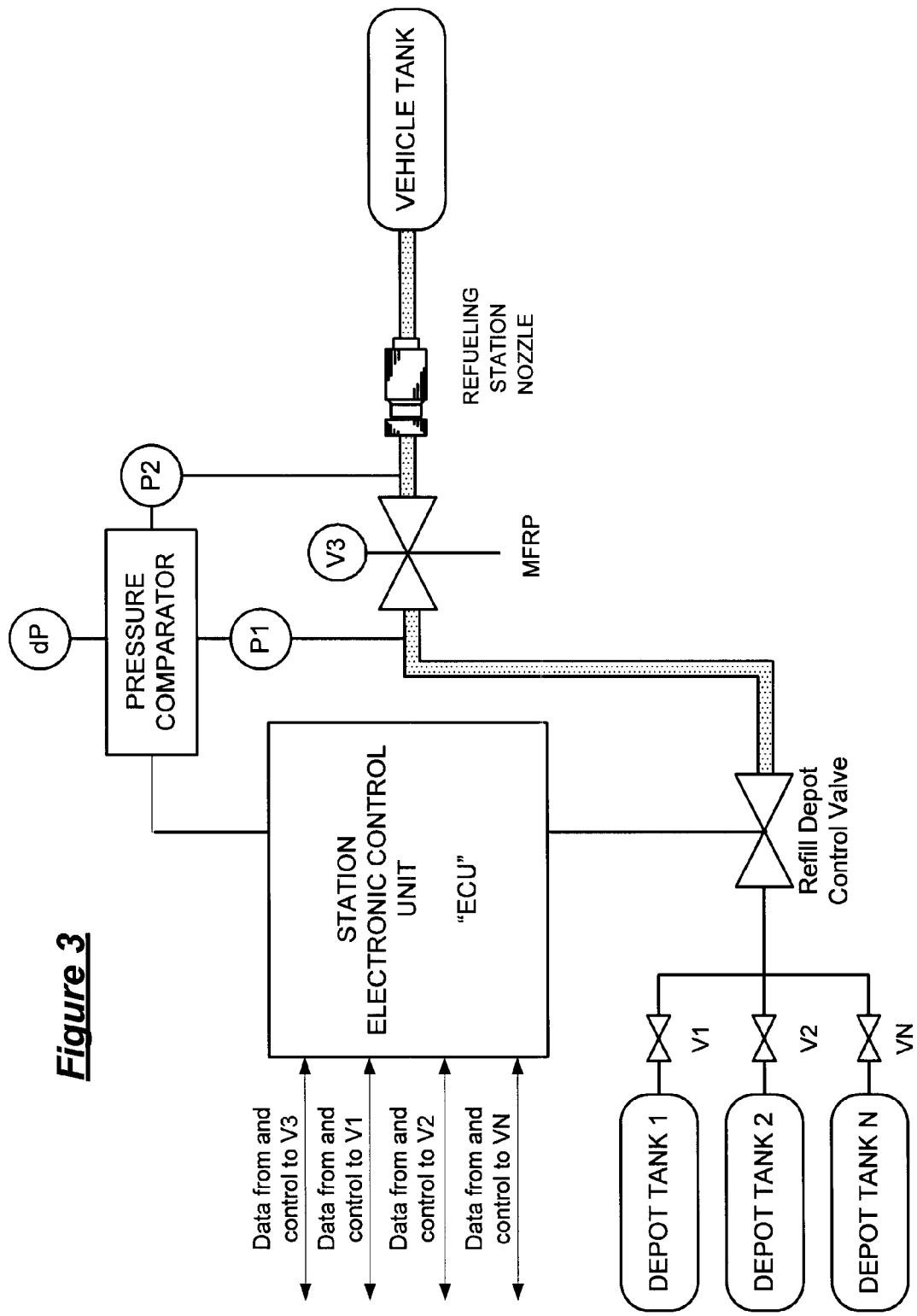
FIG. 3 illustrates the interconnection of pressure sensors and valves at the refill depot tanks wherein P1 is pressure at one side of the restriction point, P2 is pressure on the other side of the restriction point leading to the vehicle tank. A pressure comparator shows the difference between P1 and P2, dP, a signal fed into an electronic control unit, ECU, that is programmed to monitor pressure differences and control valve switches in accordance with the invention.

FIG. 3 illustrates an example of an electronic control unit, ECU, for the dP method wherein sensors measure pressures and determine the differential between P1 and P2 at the main restriction point MFRP (station and vehicle sides of the depot dispenser). The ECU will control tank switching of gas flow from the tanks in the station bank through the vehicle refill gas flow circuit. The pressure difference at the refilling system main restriction point, namely the difference between pressures on opposite sides of the MFRP, station pressure side P1 and vehicle tank pressure side P2, should approach zero at a full consumption of gas from one tank in a bank or at a full fill. An optional main dispensing valve MDV at the front of the refill tanks controls overall on/off flow at the depot. The ECU may also monitor and control gas flow and switching, in parallel or series, or other predetermined sequence of the depot tanks and banks of tanks.

Example 4

Figure 4:
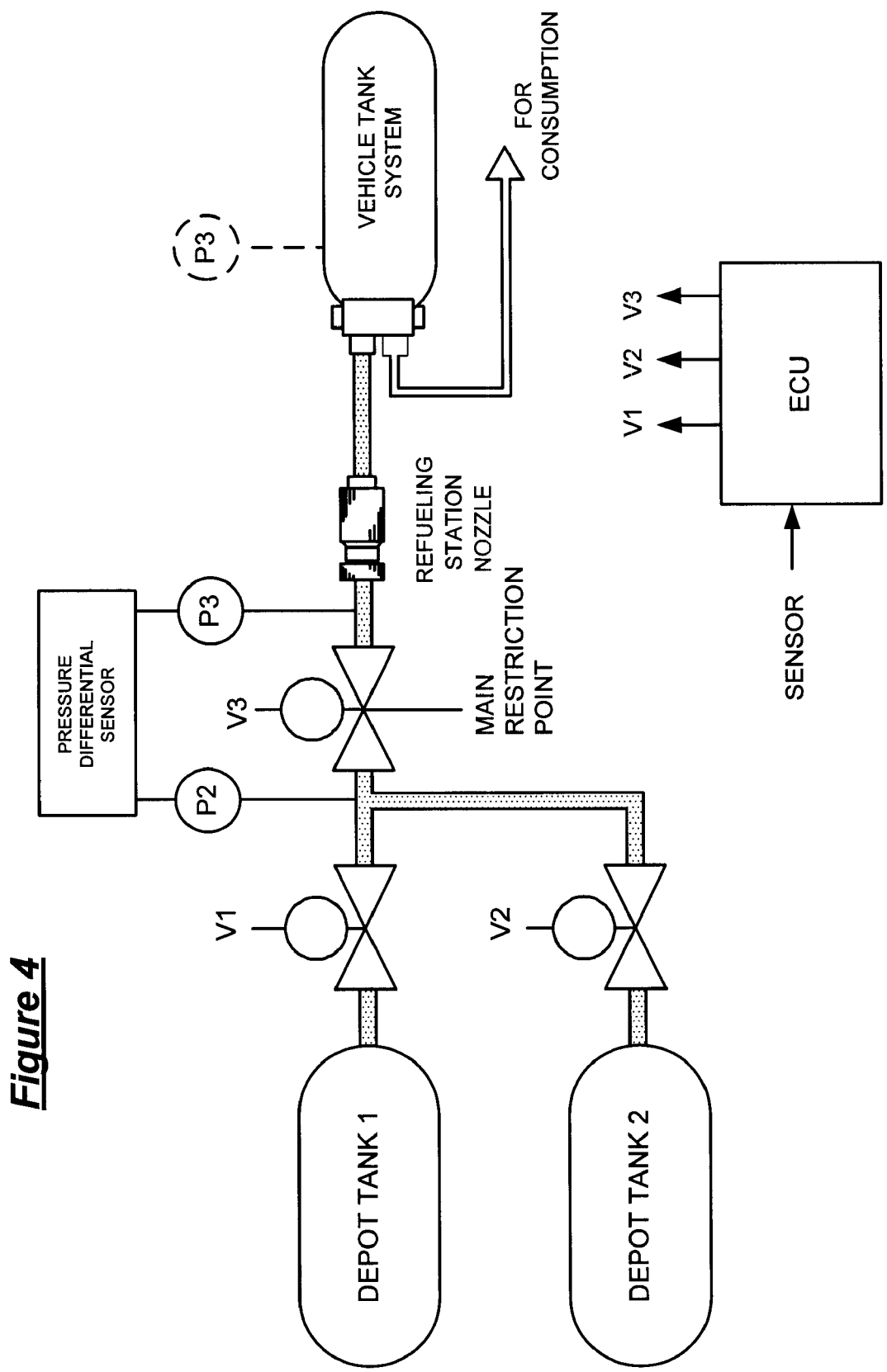
FIG. 4 shows an alternate example of a pressure monitoring configuration.

FIG. 4 illustrates another example of the dP method using a pressure sensors at station tanks to detect the pressure difference with depot station switching. The ECU is interconnected to the pressure sensors at the restriction point MFRP, namely both sides of the dispenser receptacle outlet P1 and P2. Optionally, P2 can be measured from the vehicle tank. The ECU monitors the dP and will notify a full status or tank switch status and disconnect the active tank when the difference between station side pressure P1 and vehicle side pressure P2, dP, equals 0, or approximately 0.

Advantages of the system, in addition to low cost, include durability as, pressure effects of the station compressor stopping and starting, heat effects of gas compression, and electrical effects [noise] from the station do not substantially affect the accuracy of the pressure comparison method.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrations as described. Rather, it is intended that the scope of the invention be determined by the appended claims.

The invention claimed is:

1. At a refuel depot where on board vehicle tanks are refueled from a bank of independently switched storage tanks containing high pressure fuel gas, a switching apparatus for determining which one of the depot storage tanks is activated to allow gas flow to the on board vehicle tank when gas in the storage tanks of high pressure gas at the depot utilized for refueling the on board fuel-tanks, comprising:
 (i) a gas flow circuit interconnecting the bank of storage tanks to an inlet of the vehicle tanks;
 (ii) a control valve in the gas flow circuit between the bank of storage tanks and the vehicle tank inlet;
 (iii) a first pressure sensor that monitors gas pressure at a depot side of the control valve, the first pressure sensor connected in advance of and proximate to the control valve with respect to the direction of gas flow;
 (iv) a second pressure sensor that monitors gas pressure at a vehicle side of the control valve, the second sensor connected at the vehicle side of the control valve;
 (v) gas flow outlet valves $V_1 \ldots V_n$, each outlet valve associated separately with each one of the storage tanks;
 (vi) a gas flow switching valve located a) between the gas flow outlet valves $V_1 \ldots V_n$ of each depot storage tank or b) at a connection leading from at least two gas flow outlet valves $V_1 \ldots V_n$; and
 (vii) a programmed control unit to control the valves comprising a pressure comparator measuring a) a first pressure at the first pressure sensor (P1) and b) a second pressure at the second pressure sensor (P2);
 wherein, when a pressure difference between the P1 and P2 equals approximately 0 and a desired pressure for a fill (P3) has not been met, gas flow switches from a first storage tank at the depot to a next storage tank at the depot and, when the difference between P1 and P2 equals approximately 0, and P3 has been met, the control valve is closed.

2. The apparatus of claim 1 wherein the control unit regulates the flow of gas from tanks $T_i \ldots T_n$ and tanks $T_i \ldots T_n$ are interconnected in series.

3. The apparatus of claim 1 wherein the control unit regulates the flow of gas from tanks $T_i \ldots T_n$, and tanks $T_i \ldots T_n$, are interconnected in parallel.

4. Apparatus in accordance with claim 1 wherein the switching of gas flow from tanks at the depot based upon the pressure difference is successively repeated from a tank $T_i$, to a tank $T_2$, from tank $T_2$, to a tank $T_3$, ultimately to a tank $T_n$, until the vehicle tank is filled.

5. Apparatus of claim 1 wherein switchable outlet valves $V_1 \ldots V_n$ are respectively associated with tanks $T_i \ldots T_n$ of the depot tank system and wherein the control unit controls a) the opening and closing of gas flow outlet valves $V_1 \ldots V_n$, associated with tanks $T_i \ldots T_n$ when the gas flow control valve interposed in the interconnection is closed, and b) the opening and closing of the gas flow control valve interposed in the interconnection based upon the pressure difference.

6. At a refuel depot where a system of on board refillable tanks in a vehicle are refueled from a bank of independently switched multiple dispensing tanks containing a high pressure gas $T_i \ldots T_n$, a switching apparatus for determining which one of the multiple dispensing tanks is activated to allow gas flow to the refillable tank when the dispensing tanks are successively utilized for refueling the refillable tanks in the vehicle, comprising:
 (i) a gas flow circuit interconnecting the bank of refuel dispensing tanks to an inlet of the vehicle tank system;
 (ii) a control valve in the gas flow circuit between the refill depot outlet and the vehicle tank inlet;
 (iii) a first pressure sensor that monitors gas pressure at the depot side of the control valve, the first pressure sensor connected proximate to and in advance of the inlet of the control valve with respect to the flow of gas;

(iv) a second pressure sensor that monitors gas pressure at the vehicle side of the control valve, the second sensor connected after the control valve with respect to the flow of gas; and (v) a pressure comparator measuring a) a first pressure at the first pressure sensor and b) a second pressure at the second pressure sensor;

(vi) gas flow outlet valves $V_1 \ldots V_n$, each outlet valve associated separately with each one of the dispensing tanks $T_1 \ldots T_n$;

(vii) at least one gas flow switching valve, each switching valve located a) between two gas flow outlet valves $V_1 \ldots V_n$, or b) at a connection to at least two gas flow outlet valves $V_1 \ldots V_n$; and (viii) a programmed control unit regulating a) outlet valves $V_1 \ldots V_n$, b) the switching valves, and c) the control valve to allow gas to flow from a first dispensing tank $T_1$, or from a next dispensing tank $T_n$, to the vehicle tank;

wherein, when a pressure difference between the first pressure and the second pressure measured by the pressure comparator is a predetermined value, gas flow switches from tank $T_1$ to tank $T_n$ when a desired pressure for a fill has not been met, and the control valve is closed when the desired pressure for the fill has been met.

7. Apparatus in accordance with claim 6 wherein the switching of gas flow from tanks at the depot based upon the pressure difference is successively repeated and gas flow is switched from tank $T_i$, to tank $T_2$, from tank $T_2$, to tank $T_3$, successively to tank $T_n$, until the vehicle tank is filled or the pressure at the depot side is less than the pressure at the vehicle side.

8. Apparatus of claim 6 wherein the control unit determines the opening and closing of the gas flow outlet valves $V_1 \ldots V_n$ respectively associated with tanks $T_i \ldots Tn$ of the depot tank system, the opening and closing of the switching valves, and the opening and closing of the control valve associated with the intersection.

9. Apparatus of claim 6 wherein the control unit regulates the flow of gas from tanks $T_i \ldots T_n$ and tanks $T_i \ldots T_n$ are interconnected in series.

10. Apparatus of claim 6 wherein the control unit regulates the flow of gas from tanks $T_i \ldots T_n$ and tanks $T_i \ldots T_n$, are interconnected in parallel.

* * * * *